US008429027B2

(12) United States Patent
Zheng

(10) Patent No.: US 8,429,027 B2
(45) Date of Patent: Apr. 23, 2013

(54) MOBILE-BASED REAL-TIME FOOD-AND-BEVERAGE RECOMMENDATION SYSTEM

(75) Inventor: Zhaohui Zheng, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 354 days.

(21) Appl. No.: 12/941,842

(22) Filed: Nov. 8, 2010

(65) Prior Publication Data

US 2012/0116915 A1 May 10, 2012

(51) Int. Cl.
G06Q 30/00 (2012.01)

(52) U.S. Cl.
USPC ........... 705/26.7; 705/26.1; 705/27.1; 705/15

(58) Field of Classification Search ................. 705/26.1, 705/27.1, 26.7, 15
See application file for complete search history.

(56) References Cited

U.S. PATENT DOCUMENTS

| | | | |
|---|---|---|---|
| 2007/0168208 A1* | 7/2007 | Aikas et al. | 705/1 |
| 2009/0076920 A1* | 3/2009 | Feldman et al. | 705/15 |
| 2010/0169340 A1* | 7/2010 | Kenedy et al. | 707/758 |
| 2011/0178885 A1* | 7/2011 | Xiong | 705/16 |
| 2011/0270774 A1* | 11/2011 | Varshavsky et al. | 705/319 |
| 2011/0289015 A1* | 11/2011 | Mei et al. | 705/347 |

OTHER PUBLICATIONS

"New phone apps will find you appetizers and more" (Brown, Kim. McClatchy—Tribune Business News [Washington] Oct. 28, 2010).*
Cheng, H. et al., "Recommendation via Query Centered Random Walk on K-partite Graph," *Proceedings of the 2007 Seventh IEEE International Conference on Data Mining*, 457-462, 2007.
Long, Bo et al., "A Probabilistic Framework for Relational Clustering," *13th ACM International Conference on Knowledge Discovery and Data Mining*, 470-479, 2007.
Long, Bo et al., "Unsupervised Learning on K-partite Graphs," *12th ACM International Conference on Knowledge Discovery and Data Mining*, 317-326, 2006.
PCT/US11/59617: Application as filed on Nov. 7, 2011, 46 pages.

* cited by examiner

*Primary Examiner* — Courtney Stopp
(74) *Attorney, Agent, or Firm* — Berkeley Law & Technology Group, LLP

(57) ABSTRACT

Particular embodiments extract a plurality of users, a plurality of establishments, and a plurality of items from dining information provided by at least one of the plurality of users, each of the plurality of establishments sells food or beverage; construct a user-establishment matrix, a user-item matrix, and an establishment-item matrix using the plurality of users, the plurality of establishments, and the plurality of items; generate a user latent representation for the plurality of users, an establishment latent representation for the plurality of establishments, and an item latent representation for the plurality of items; and compute one or more correlations using the user latent representation, the establishment latent representation, or the item latent representation, wherein each of the one or more correlations is between two users, two establishments, two items, one user and one establishment, one of user and one item, or one establishment and one item.

17 Claims, 4 Drawing Sheets

US 8,429,027 B2

MOBILE-BASED REAL-TIME FOOD-AND-BEVERAGE RECOMMENDATION SYSTEM

TECHNICAL FIELD

The present disclosure generally relates to a product and/or service recommendation system and more specifically relates to recommending food and/or beverages to consumers in real time via mobile devices.

BACKGROUND

Consumers often receive recommendations on products and/or services from various sources, such as merchants, experts, advertisers, friends, families, etc. Such recommendations may be provided to the consumers at any time, but usually when the consumers express interest in certain types of products or services. Sometimes, the recommended products or services are determined based on what specific products or services the other consumers, who are also interested in similar types of products or services, have purchased in the past. For example, when a consumer purchases a book from amazon.com, an Internet-based merchant that sells various types of products, amazon.com may recommend to the consumer other books that have been purchased by other consumers who have also purchased, in the past, the same book that is currently being purchased by the consumer. As another example, when a consumer wants to purchase a digital camera, he may ask his friends what brands and models of digital cameras they have purchased and make a selection based on his friends' recommendations.

SUMMARY

The present disclosure generally relates to a product and/or service recommendation system and more specifically relates to recommending food and/or beverages to consumers in real time via mobile devices.

In particular embodiments, a food-and-beverage recommendation system may recommend food and/or beverages to consumers in real time and via their mobile devices. In particular embodiments, the consumers are the users of the food-and-beverage recommendation system. In particular embodiments, when the users dine out, they may provide information on the establishments at where they have dined and the food and/or beverages they have ordered to the food-and-beverage recommendation system. The food-and-beverage recommendation system may process the information to determine recommendations for food and/or beverages with respect to specific establishments and/or specific users. In particular embodiments, the food and/or beverage recommendations may be provided to the individual users when they are dining at specific establishments.

In particular embodiments, a food-and-beverage recommendation system extracts a plurality of users, a plurality of establishments, and a plurality of items from dining information provided by at least one of the plurality of users. Each of the plurality of establishments sells food or beverage and has been visited by at least one of the plurality of users. Each of the plurality of items is food or beverage sold at least one of the plurality of establishments and has been ordered by at least one of the plurality of users at least one of the plurality of establishments. The food-and-beverage recommendation system constructs a user-establishment matrix, a user-item matrix, and an establishment-item matrix using the plurality of users, the plurality of establishments, and the plurality of items; generates a user latent representation for the plurality of users, an establishment latent representation for the plurality of establishments, and an item latent representation for the plurality of items; and computes one or more correlations using the user latent representation, the establishment latent representation, or the item latent representation, wherein each of the one or more correlations is between two of the plurality of users, two of the plurality of establishments, two of the plurality of items, one of the plurality of users and one of the plurality of establishments, one of the plurality of users and one of the plurality of items, or one of the plurality of establishments and one of the plurality of items.

In particular embodiments, the food-and-beverage recommendation system receives a recommendation request from a mobile device associated a first one of the plurality of users at a first one of the plurality of establishment; determines one or more item recommendations with respect to the first user and the first establishment using the plurality of user-user correlations, the plurality of establishment-establishment correlations, the plurality of item-item correlations, the plurality of user-establishment correlations, the plurality of user-item correlations, and the plurality of establishment-item correlations; and transmits the one or more item recommendations to the mobile device.

These and other features, aspects, and advantages of the disclosure are described in more detail below in the detailed description and in conjunction with the following figures.

DESCRIPTION OF EXAMPLE EMBODIMENTS

Figure 1:
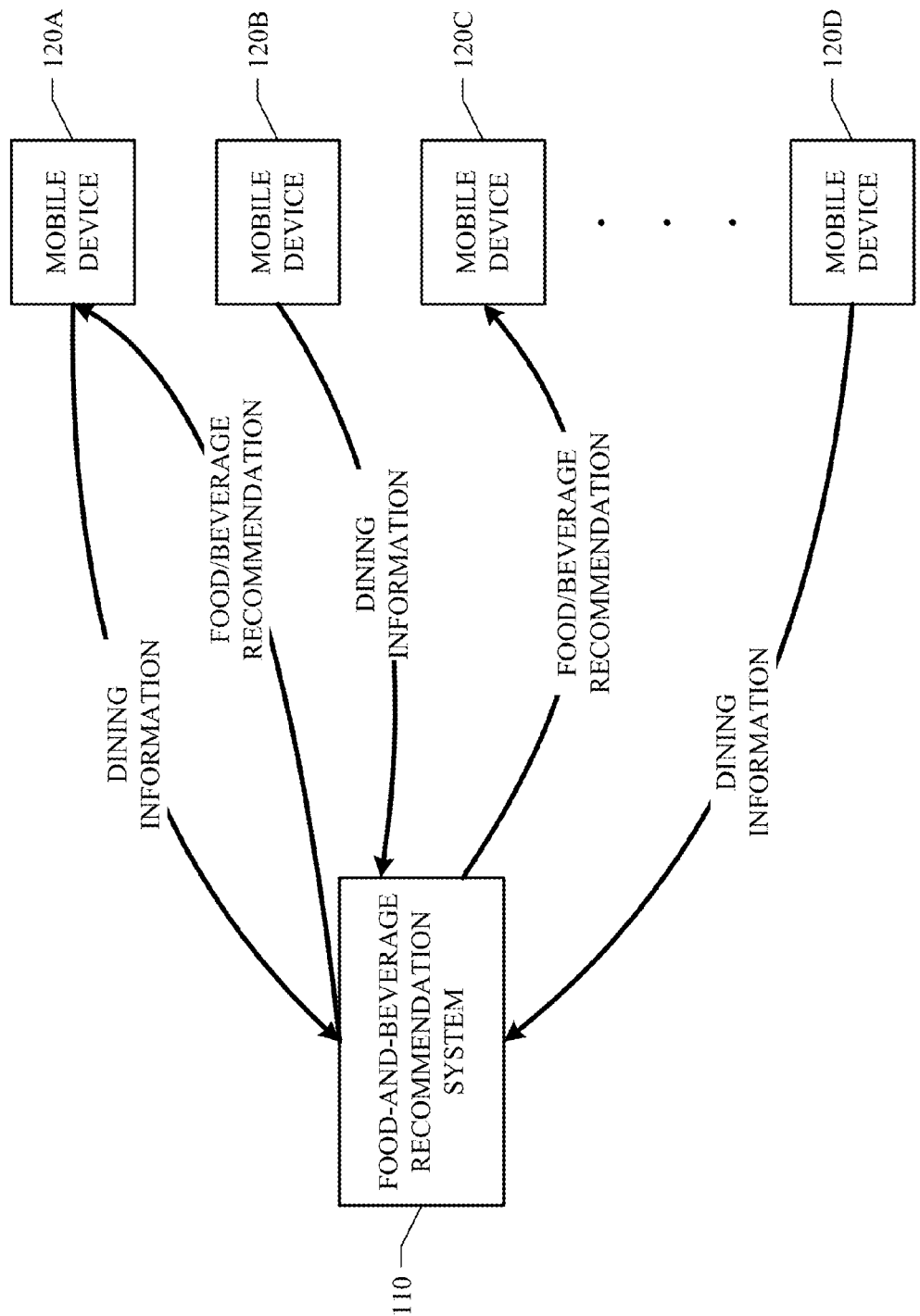
FIG. 1 illustrates an example system for providing real-time food and/or beverage recommendations to users of a food-and-beverage recommendation system.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

There are various Internet-based resources (e.g., Yelp® at "www.yelp.com" and Yahoo!® Local at "local.yahoo.com") that provide their users with reviews and recommendations on business establishments, such as restaurants, fast food stores, beverage houses, etc. The recommendations are often determined based on the available user reviews. For example, an establishment that has received good reviews from some users may be recommended to other users. However, the quality of such recommendations suffer from a lack of a sufficient number of reviews provided by a sufficient number of users to a sufficient number of establishments. In the first place, not many people are willing to spend the time and effort to write reviews. Moreover, for those people who do write reviews, usually, each person is able to write only a few reviews to a few establishments. As a result, only a limited number of establishments (e.g., famous, popular, or large establishments) have received user reviews, and among these, each establishment only has a limited number of user reviews. Consequently, the quality of the recommendations is limited by the small number of user reviews provided to the small number of establishments. In addition, since these reviews are provided to the individual establishments, the recommendations are at establishment level as well (i.e., recommending the individual establishments instead of the individual food and/or beverage items sold at the establishments).

To improve the quality of recommendations on the business establishments and the items sold at these establishments, particular embodiments extract a set of users, a set of establishments, and a set of items from dining information provided by the users. Particular embodiments construct a user-establishment matrix, a user-item matrix, and an establishment-item matrix using the set of users, the set of establishments, and the set of items. Particular embodiments generate a user latent representation for the set of users, an establishment latent representation for the set of establishments, and an item latent representation for the set of items. Particular embodiments compute a set of user-user correlations, a set of establishment-establishment correlations, a set of item-item correlations, a set of user-establishment correlations, a set of user-item correlations, and a set of establishment-item correlations using the user latent representation, the establishment latent representation, and the item latent representation. Particular embodiments make real-time recommendations on the individual items sold at the individual establishments to the individual users while they are at those establishments.

In particular embodiments, an "establishment" refers to a business establishment that sells food and/or beverages, such as, for example and without limitation, restaurants, fast food stores, candy stores, delicatessens, cafeterias, cafés, eateries, bakeries, beverage houses, bars, etc. In particular embodiments, an "item" refers to a food or beverage item sold at an establishment. In particular embodiments, an item may be any item listed on the menu of an establishment, such as, for example and without limitation, appetizers, salads, soups, main courses, side dishes, desserts, sodas, cocktails, wines, etc.

FIG. 1 illustrates an example food-and-beverage recommendation system 110 capable of providing real-time food and/or beverage recommendations to its users. In particular embodiments, food-and-beverage recommendation system 110 may be capable of communicating with any number of mobile devices 120. In particular embodiments, the communications between food-and-beverage recommendation system 110 and any mobile device 120 are via wireless connections using any suitable wireless communication protocol. In particular embodiments, each mobile device 120 may be associated with a user of food-and-beverage recommendation system 110.

In particular embodiments, when a user dines at an establishment (e.g., a restaurant), the user may transmit dining information to food-and-beverage recommendation system 110 using his mobile device 120. Similarly, the user may request and receive food and/or beverage recommendations from food-and-beverage recommendation system 110 using his mobile device 120. Note that a user may both provide dining information to and receive food and/or beverage recommendations from food-and-beverage recommendation system 110, provide dining information to food-and-beverage recommendation system 110 without receiving any recommendations, or request and receive food and/or beverage recommendations from food-and-beverage recommendation system 110 without providing any information.

In particular embodiments, a person needs to become a registered user of food-and-beverage recommendation system 110 before he can use the services provided by food-and-beverage recommendation system 110. In particular embodiments, each registered user of food-and-beverage recommendation system 110 has a user identifier that uniquely identifies that user. Optionally, each registered user of food-and-beverage recommendation system 110 may have a password associated with his unique user identifier so that the user may access food-and-beverage recommendation system 110 securely.

In particular embodiments, each registered user of food-and-beverage recommendation system 110 has a user profile that includes information concerning the user, such as, for example and without limitation, the user's demographic information (e.g., address, gender, age, family status, work status, etc.), the mobile device (e.g., mobile device 120) associated with the user, the user's culinary preferences (e.g., favorite restaurants, food, beverages, etc.), and other features. In particular embodiments, the mobile device associated with each registered user of food-and-beverage recommendation system 110 may have a mobile-device identifier that uniquely identifies that mobile device, and the mobile-device identifier may be included in the user profile of the user associated with that mobile device. For example, a mobile device may be identified by the unique telephone number assigned to it, or its unique serial number.

Figure 2:
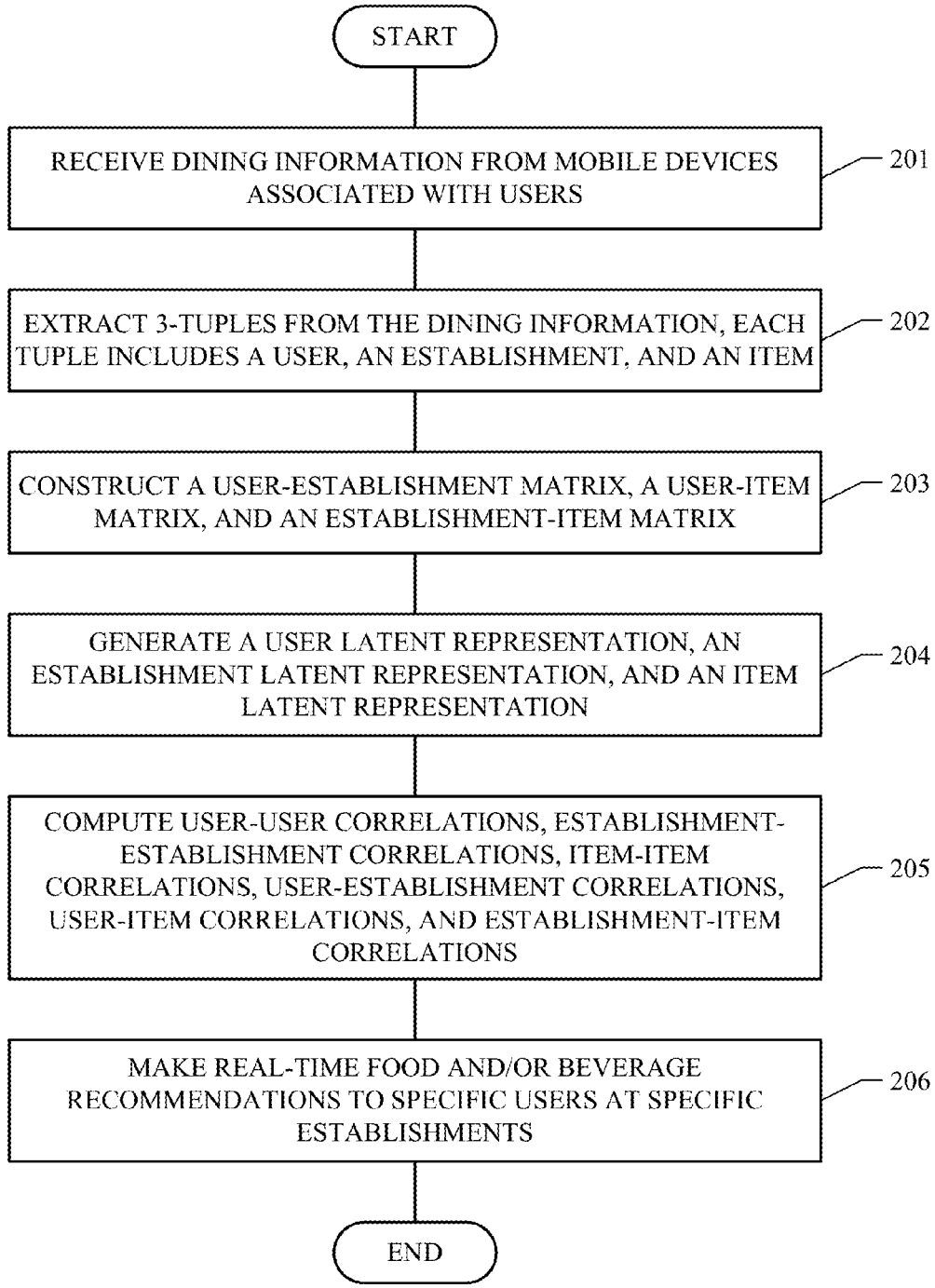
FIG. 2 illustrates an example method for providing real-time food and/or beverage recommendations to users of a food-and-beverage recommendation system.

FIG. 2 illustrates an example method for providing real-time food and/or beverage recommendations to users of a food-and-beverage recommendation system. Particular embodiments may receive dining information from individual mobile devices associated with individual users, as illustrated in STEP 201. In particular embodiments, these users are registered users of a food-and-beverage recommendation system, and the dining information is transmitted to the food-and-beverage recommendation system from the mobile devices associated with the user via wireless connections.

In particular embodiments, the dining information may include the establishments the users have visited and the food and/or beverage items the users have ordered at the individual establishments. Optionally, the dining information may include, for example and without limitations, the type (e.g., restaurant, café, beverage house, bar, etc.), food category (e.g., seafood, barbecue, steak house, vegetarian, etc.), ethnicity (e.g., Cajun food, Italian food, French food, Chinese food, Mediterranean food), location (e.g., city and state, zip code, latitude and longitude), or user rating (e.g., a numeric score) of each establishment. The dining information may also include, for example and without limitations, the type (e.g., drink, appetizer, side dish, bread, main course, dessert, etc.), price, or user rating (e.g., a numeric score) of each food or beverage item. Any information concerning an establishment or a food or beverage item may be considered dining information and provided to the food-and-beverage recommendation system.

There are various methods for a user to provide dining information to the food-and-beverage recommendation system, and the present disclosure contemplates any suitable method. In particular embodiments, a user may provide dining information in text format. The user may manually input the dining information as texts (e.g., the name of an establishment, and the name, price, and user rating of each food or beverage item ordered at the establishment) into his mobile device and transmit the texts to the food-and-beverage recommendation system. The food-and-beverage recommendation system may process the texts to extract the appropriate dining information.

In particular embodiments, a user may provide dining information as digital images. If the user's mobile device has a built-in digital camera, the user may take digital photos of the individual food and/or beverage items ordered at an establishment (perhaps with the permission of the establishment). The user may transmit the digital photos (e.g., the digital photos stored as image files) to the food-and-beverage recommendation system. The food-and-beverage recommendation system may apply various image processing and recognition techniques to automatically determine individual food and/or beverage items from the digital photos.

Often, a digital photo has associated metadata, one of which may be the geographic location (e.g., represented as latitude and longitude) where the digital photo is taken. In particular embodiments, the food-and-beverage recommendation system may use the geographic location metadata of a digital photo to automatically determine the location, and consequently the establishment itself, where the photo is taken. In this case, it is not necessary for the user to provide information (e.g., the name) of the establishment where the user has visited separately. The establishment where the user has ordered the food or beverage item in the digital photo may be automatically determined from the metadata (e.g., the geographic location metadata) of the digital photo.

If the user takes a digital photo of a food or beverage item in an establishment and transmits that digital photo to the food-and-beverage recommendation system while the user is still at the establishment, in particular embodiments, the food-and-beverage recommendation system may use the signal from the mobile device used by the user to determine the location from where the digital photo is transmitted. This location is in fact the location of the establishment. The location information may then be compared, for example, with information in a database to determine the establishment that the user has visited. Again, in this case, it is not necessary for the user to provide information of the establishment where the user has visited separately. The establishment where the user has ordered the food or beverage item in the digital photo may be automatically determined from the mobile device's communication signals.

In order to more accurately identify the food or beverage item in each digital photo, in particular embodiments, the food-and-beverage recommendation system may collect from various establishments digital images of individual food and/or beverage items and store these digital images in a database associated with the food-and-beverage recommendation system, together with some form of identifiers indicating what specific food and/or beverage items they are. Then, when the food-and-beverage recommendation system receives a digital photo from a user's mobile device, in additional to applying image recognition techniques, the food-and-beverage recommendation system may compare the user's digital photo with the digital images stored in the database. If an digital image similar to the user's digital photo is found in the database, that similar digital image may be used to help identify the food or beverage item in the user's digital photo.

In particular embodiments, a user may take a digital photo of a dining bill from an establishment. A dining bill typically includes each food or beverage item the user has ordered at the establishment, and its price. In addition, a dining bill often includes information about the establishment itself (e.g., the name and telephone number of the establishment). The user may transmit the digital image (e.g., the digital photo saved as an image file) of the dining bill to the food-and-beverage recommendation system. The food-and-beverage recommendation system may apply various image processing and recognition techniques to automatically determine the individual food and/or beverage items, their prices, as well as the establishment itself, from the digital image of the dining bill.

If a user's mobile device has a built-in digital scanner, the user may scan a dining bill as either a digital image or as texts, and transmit the digital image or texts to the food-and-beverage recommendation system. If the dining bill is scanned as a digital image, the food-and-beverage recommendation system may apply various image processing and recognition techniques to automatically determine the individual food and/or beverage items, their prices, as well as the establishment itself, from the digital image of the dining bill. If the dinning bill is scanned as texts, the food-and-beverage recommendation system may parse the texts to extract the establishment, as well as the individual food and/or beverage items and their prices.

In particular embodiments, a user may provide dining information as digital recordings. If the user's mobile device has a built-in digital recorder, the user may record his conversation with a service personnel (e.g., a waiter or waitress) as the user orders food and/or beverages at an establishment (perhaps with the permission of the service personnel). The user may transmit the digital recording (e.g., the digital recording stored as an audio file) to the food-and-beverage recommendation system. The food-and-beverage recommendation system may apply various voice processing and speech recognition techniques to automatically determine the individual food and/or beverage items ordered by the user from the digital recording.

In particular embodiments, a user may provide dining information as bar codes. In order to more accurately and conveniently identify the individual establishments and the individual food or beverage items, in particular embodiments, a unique bar code may be attached to each item on the menu of each establishment or to other suitable places. The corresponding information may be stored in a database associated with the food-and-beverage recommendation system. If a user's mobile device has a built-in bar-code scanner, the user may scan the bar codes corresponding to the specific food and/or beverage items he has ordered at an establishment, and transmits the bar codes to the food-and-beverage recommendation system. The food-and-beverage recommendation system may process the bar codes to determine which specific establishment the user has visited and which specific food and/or beverage items the user has ordered at that establishment based on the information stored in the database.

The food-and-beverage recommendation system may support any combination of the various methods that enable its users to provide dining information to it. In particular embodiments, over some period of time, the food-and-beverage recommendation system may receive and collect dining information from many users visiting many establishments and ordering many food and/or beverage items. Particular embodiments may mine the dining information collected from the users over some period of time by conducting tripartite graph mining or tensor factorization for the purpose of determining food and/or beverage recommendations for the individual users. In particular embodiments, the purposes of mining the dining information are to profile each user with his favorite food and/or beverage items or favorite food and/or beverage types and his authority score distribution on the food and/or beverage items or types, and profile each establishment with its strength distribution on the food and/or beverage items or types it offers.

In particular embodiments, each time a user provides dining information to the food-and-beverage recommendation system, particular embodiments may extract a set of tuples from the dining information, where each tuple includes a user, an establishment, and an item (either food or beverage), as illustrated in STEP 202. For example, suppose John Smith, who is a registered user of the food-and-beverage recommendation system, has visited a Chili's Restaurant and ordered a club sandwich and an iced tea for lunch. When John Smith transmits information about his lunch to the food-and-beverage recommendation system, the food-and-beverage recommendation system may extract two tuples from John Smith's dinning information: <John Smith, Chili's, club sandwich>, and <John smith, Chili's, iced tea>. Since each user uses his mobile device to transmit the dining information, upon receiving a transmission of the dining information from a specific mobile device, particular embodiments may match the identifier of the mobile device to the identifiers of the mobile devices in the user profiles to determine to which user this mobile device belongs. That user is then matched with the establishment and the food and/or beverage items in the dining information.

In particular embodiments, each user may be identified by its user identifier. Similarly, each establishment may be identified by a unique establishment identifier, and each food or beverage item may be identified by a unique item identifier. In particular embodiments, there is a set of users, a set of establishments, and a set of food or beverage items. For clarity purposes, hereafter, let U represent a set of n1 users, E represent a set of n2 establishments, and I represent a set of n3 food or beverage items, where n1, n2, and n3 are integers and $n1 \geq 1$, $n2 \geq 1$, and $n3 \geq 1$. Note that the number of elements and the actual elements in each of the user, establishment, and item sets may change from time to time.

Particular embodiments may construct a user-establishment matrix, a user-item matrix, and an establishment-item matrix from the tuples extracted from the dining information provided by the users over time, as illustrated in STEP 203. Hereafter, let $M^{U,E}$ denote the user-establishment matrix, $M^{U,I}$ denote the user-item matrix, and $M^{E,I}$ denote the establishment-item matrix.

In particular embodiments, user-establishment matrix $M^{U,E}$ is a n2×n1 integer matrix. Each entry $m_{u,e}$ represents the number of times a corresponding user u has visited a corresponding establishment e. In particular embodiments, the numbers may be determined from the tuples.

The following TABLE 1 illustrates an example user-establishment matrix $M^{U,E}$. For example, TABLE 1 indicates that user $u_1$ has visited establishment $e_1$ three times, establishment $e_3$ twelve times, but has never visited establishment $e_2$. Similarly, user $u_2$ has visited establishment $e_2$, but has never visited establishments $e_1$, $e_3$ and $e_{n2}$. In particular embodiments, it is possible that a user from user set U has never provided dining information with respect to any establishment from establishment set E. In this case, all entries in user-establishment matrix $M^{U,E}$ corresponding to this user may be 0.

TABLE 1

| an example user-establishment matrix | | | | |
| --- | --- | --- | --- | --- |
|  | $e_1$ | $e_2$ | $e_3$ | ... | $e_{n2}$ |
| $u_1$ | 3 | 0 | 12 | | 9 |
| $u_2$ | 0 | 2 | 0 | | 0 |

TABLE 1-continued

| an example user-establishment matrix | | | | |
| --- | --- | --- | --- | --- |
|  | $e_1$ | $e_2$ | $e_3$ | ... | $e_{n2}$ |
| $u_3$ | 1 | 5 | 0 | | 0 |
| ... | | | | | |
| $u_{n1}$ | 0 | 0 | 2 | | 21 |

In particular embodiments, user-item matrix $M^{U,I}$ is a n3×n1 integer matrix. Each entry $m_{u,i}$ represents the number of times a corresponding user u has ordered a corresponding food or beverage item i. In particular embodiments, the same food or beverage item may be offered at multiple establishments, and a user may order a specific food or beverage item at any establishment. In particular embodiments, the numbers may be determined from the tuples.

The following TABLE 2 illustrates an example user-item matrix $M^{U,I}$. For example, TABLE 2 indicates that user $u_1$ has ordered item $i_2$ four times, but has never ordered item $i_1$. Similarly, user $u_3$ has ordered item $i_1$ eight times, but has never ordered item $i_2$. In particular embodiments, it is possible that a user from user set U has never provided dining information concerning any item from item set I. In this case, all entries in user-item matrix $M^{U,I}$ corresponding to this user may be 0.

TABLE 2

| an example user-item matrix | | | | |
| --- | --- | --- | --- | --- |
|  | $i_1$ | $i_2$ | $i_3$ | ... | $i_{n3}$ |
| $u_1$ | 0 | 4 | 17 | | 0 |
| $u_2$ | 4 | 0 | 2 | | 0 |
| $u_3$ | 8 | 0 | 7 | | 25 |
| ... | | | | | |
| $u_{n1}$ | 0 | 9 | 0 | | 0 |

In particular embodiments, establishment-item matrix $M^{E,I}$ is a n3×n2 binary or Boolean matrix. Each entry $m_{e,i}$ represents whether a corresponding establishment e offers a corresponding food or beverage item i. For example, the value 1 may indicate that an establishment offers an item, and a value 0 may indicate that an establishment does not offer an item. In particular embodiments, the same food or beverage item may be offered at multiple establishments. For example, multiple restaurants may offer club sandwich, spaghetti with meat balls, iced tea, or tiramisu. In particular embodiments, the values may be determined from the tuples.

The following TABLE 3 illustrates an example establishment-item matrix $M^{E,I}$. For example, TABLE 3 indicates that establishment $e_1$ offers item $i_2$, but does not offer items $i_1$, $i_3$, and $i_{n3}$. Similarly, establishment $e_3$ offers items $i_1$ and $i_3$, but has never ordered item $i_2$ and $i_{n3}$. In particular embodiments, it is possible that an item from item set I is not offered by any establishment from establishment set E. In this case, all entries in establishment-item matrix $M^{E,I}$ corresponding to this item may be 0.

TABLE 3

| an example establishment-item matrix | | | | |
| --- | --- | --- | --- | --- |
|  | $i_1$ | $i_2$ | $i_3$ | ... | $i_{n3}$ |
| $e_1$ | 0 | 1 | 0 | | 0 |
| $e_2$ | 0 | 1 | 1 | | 1 |

TABLE 3-continued an example establishment-item matrix

|  | $i_1$ | $i_2$ | $i_3$ | ... | $i_{n3}$ |
|---|---|---|---|---|---|
| $e_3$ | 1 | 0 | 1 |  | 0 |
| ... |  |  |  |  |  |
| $e_{n2}$ | 0 | 0 | 0 |  | 1 |

Particular embodiments may generate a user latent representation for the set of users, an establishment latent representation for the set of establishment, and an item latent representation for the set of items using user-establishment matrix $M^{U,E}$, user-item matrix $M^{U,I}$, and establishment-item matrix $M^{E,I}$, as illustrated in STEP 204. In particular embodiments, the user latent representation is the representation of the set of users, U, in a latent user space; the establishment latent representation is the representation of the set of establishments, E, in a latent establishment space; and item latent representation is the representation of the set of items, I, in a latent item space.

Particular embodiments may generate the three types of latent representations by optimizing the following loss function using stochastic gradient descent:

$$l(M^{U,E}, U^{d1} W^{U,E} E^{d2}) + \alpha 1 l(M^{E,I}, E'^{d2} W^{E,I} I^{d3}) + \alpha 2 l(M^{U,I}, U^{d1} W^{U,I} I^{d3}) + \beta 1 \|U^{d1}\|_p + \beta 2 \|E^{d2}\|_p + \beta 3 \|I^{d3}\|_p. \quad (1)$$

In EQUATION (1), $l(\ )$ may be any loss function, such as, for example and without limitation, mean squared error, etc. $U^{d1}$ is a $d1 \times n1$ matrix representing the n1 users in the latent d1-dimensional user space, where $d1 \geq 1$; $E^{d2}$ is a $d2 \times n2$ matrix representing the n2 establishments in the latent d2-dimensional establishment space, where $d2 \geq 1$; $E'^{d2}$ is the transpose matrix of $E^{d2}$; and $I^{d3}$ is a $d3 \times n3$ matrix representing the n3 food and/or beverage items in the latent d3-dimensional item space, where $d3 \geq 1$. $W^{U,E}$ is a $d1 \times d2$ convariance matrix for user and establishment; $W^{E,I}$ is a $d2 \times d3$ convariance matrix for establishment and item; and $W^{U,I}$ is a $d1 \times d3$ convariance matrix for user and item. $\|U^{d1}\|_p$ is the p-norm regularization for $U^{d1}$; $\|E^{d2}\|_p$ is the p-norm regularization for $E^{d2}$; and $\|I^{d3}\|_p$ is the p-norm regularization for $I^{d3}$. $\alpha 1, \alpha 2, \beta 1, \beta 2,$ and $\beta 3$ are real-value parameters that may be empirically tuned.

In particular embodiments, the outputs of EQUATION (1) are $U^{d1}$, $E^{d2}$, $I^{d3}$, $W^{U,E}$, $W^{U,I}$, and $W^{E,I}$. Based on these six matrices, particular embodiments may user-user correlations, establishment-establishment correlations, item-item correlations, user-establishment correlations, user-item correlations, and establishment-item correlations, as illustrated in STEP 205. Particular embodiments may profile each user and each establishment based on these correlations.

In particular embodiments, the user-user correlations indicate how similar one user is to another user in terms of their food and/or beverage preferences (e.g., flavor, taste, cuisine type, etc.). In particular embodiments, for any user, $u_j \in U$, his d1-dimensional latent vector, $\vec{U}_j$, is the $j^{th}$ row in matrix $U^{d1}$. For any two users, $u_{j1} \in U$ and $u_{j2} \in U$, their correlation, or similarity in terms of food and/or beverage preferences, may be computed as:

$$sim(u_{j1}, u_{j2}) = \vec{U}_{j1} \cdot \vec{U}_{j2}. \quad (2)$$

In particular embodiments, the establishment-establishment correlations indicate how similar one establishment is to another establishment in terms of the food and/or beverages they offer (e.g., flavor, taste, cuisine type, etc.). In particular embodiments, for any establishment, $e_j \in E$, its d2-dimensional latent vector, $\vec{E}_j$, is the $j^{th}$ row in matrix $E^{d2}$. For any two establishments, $e_{j1} \in E$ and $e_{j2} \in E$, their correlation, or similarity in terms of food and/or beverages they offer, may be computed as:

$$sim(e_{j1}, e_{j2}) = \vec{E}_{j1} \cdot \vec{E}_{j2}. \quad (3)$$

In particular embodiments, the item-item correlations indicate how similar one food or beverage item is to another item in terms of their flavor, type, category, taste, presentation, etc. In particular embodiments, for any item, $i_j \in I$, its d3-dimensional latent vector, $\vec{I}_j$, is the $j^{th}$ row in matrix $I^{d3}$. For any two items, $i_{j1} \in I$ and $i_{j2} \in I$, their correlation, or similarity in terms of flavor, taste, type, category, etc., may be computed as:

$$sim(i_{j1}, i_{j2}) = \vec{I}_{j1} \cdot \vec{I}_{j2}. \quad (4)$$

In particular embodiments, the user-establishment correlations indicate how well a user likes an establishment. In particular embodiments, for any user-establishment pair, $u_j \in U$ and $e_k \in E$, their correlation may be computed as:

$$sim(u_j, e_k) = \vec{U}_j W^{U,E} \vec{E}_k. \quad (5)$$

In particular embodiments, the user-item correlations indicate how well a user likes a food or beverage item. In particular embodiments, for any user-item pair, $u_j \in U$ and $i_k \in I$, their correlation may be computed as:

$$sim(u_j, i_j) = \vec{U}_j W^{U,I} \vec{I}_k. \quad (6)$$

In particular embodiments, the establishment-item correlations indicate how good a food or beverage item offered by an establishment is. In particular embodiments, for any establishment-item pair, $e_j \in E$ and $i_k \in I$, their correlation may be computed as:

$$sim(e_j, i_k) = \vec{E}_j W^{E,I} \vec{I}_k. \quad (7)$$

In particular embodiments, there may be any number of features or attributes associated with each user, each establishment, and each food or beverage item. For example, the features associated with each user may include, without limitation, the user's preferred ingredients, spices, food types, or beverage types, whether the user is vegetarian, concerned about presentation, environment, service quality, or availability of entertainment, etc. The features associated with each establishment may include, without limitation, the cuisine ethnicity or type of the establishment (e.g., Chinese food, Italian food, seafood, barbecue, vegetarian food, pizza, etc.), average price per entry, environment, popularity, etc. The features associated with each item may include, without limitation, the item's flavor (e.g., spicy or mild), ingredients, price, popularity, etc.

Suppose there are f1 user features, f2 establishment features, and f3 establishment features, where $f1 \geq 1, f2 \geq 1$, and $f3 \geq 1$. Particular embodiments may optionally construct a user-feature matrix, $M^{U,F}$, an establishment-feature matrix, $M^{E,F}$, and an item-feature matrix, $M^{I,F}$. In particular embodiments, $M^{U,F}$ is a $f1 \times n1$ matrix, and each entry in $M^{E,F}$ may have a value 1 or a value 0 indicating a corresponding user does or does not have a corresponding user feature respectively. $M^{E,F}$ is a $f2 \times n2$ matrix, and each entry in $M^{E,F}$ may have a value 1 or a value 0 indicating a corresponding establishment does or does not have a corresponding establishment feature respectively. $M^{I,F}$ is a $f3 \times n3$ matrix, and each entry in $M^{I,F}$ may have a value 1 or a value 0 indicating a corresponding item does or does not have a corresponding item feature respectively.

If matrices $M^{U,F}$, $M^{E,F}$, and $M^{I,F}$ are available, particular embodiments may incorporate them in EQUATION (1). Consequently EQUATION (1) may be modified as the following:

$$l(M^{U,E}, U^{d1}W^{U,E}E^{d2}) + \alpha 1 l(M^{E,I}, E'^{d2}W^{E,I}I^{d3}) + \\ \alpha 2 l(M^{U,I}, U^{d1}W^{U,I}I^{d3}) + \beta 1 \|U^{d1}\|_p + \beta 2\|E^{d2}\|_p + \beta 3\|I^{d3}\|_p + \\ \alpha 3 l(U^{d1}, M^{U,F}Z^U) + \alpha 4 l(E^{d2}, M^{E,F}Z^E) + \alpha 5 l(I^{d3}, M^{I,F}Z^I). \quad (8)$$

In EQUATION (8), $Z^U$ is a f1×d1 matrix projecting a f1-dimensional user feature vector to a d1-dimensional user latent vector; $Z^E$ is a f2×d2 matrix projecting a f2-dimensional establishment feature vector to a d2-dimensional establishment latent vector; and $Z^I$ is a f3×d3 matrix projecting a f3-dimensional item feature vector to a d3-dimensional item latent vector. The outputs of EQUATION (8) are again $U^{d1}$, $E^{d2}$, $I^{d3}$, $W^{U,E}$, $W^{U,I}$, and $W^{E,I}$, which may be used to determine various types of correlations as described above.

Particular embodiments may make real-time food and/or beverage item recommendations to individual users when the users are at specific establishments using the user-user, establishment-establishment, item-item, user-establishment, user-item, and establishment-item correlations, as illustrated in STEP 206. In particular embodiments, suppose a user, $u_j \in U$, is visiting an establishment, $e_k \in E$. Before placing an order, user $u_j$ may wish to receive recommendations on food and/or beverage items offered by establishment $e_k$. In particular embodiments, user $u_j$ may send a request to the food-and-beverage recommendation system via his mobile device. In response to this request, the food-and-beverage recommendation system may determine which establishment user $u_j$ is currently visiting. User $u_j$ may specify the establishment he is currently visiting in the request. Alternatively, the food-and-beverage recommendation system may determine the establishment user $u_j$ is currently visiting using the signals received from the mobile device of user $u_j$. In particular embodiments, the food-and-beverage recommendation system determines recommendations on the food and/or beverage items offered at establishment $e_k$ specifically for user $u_j$ using the user-user, establishment-establishment, item-item, user-establishment, user-item, and establishment-item correlations. The recommendations may be transmitted to the mobile device of user $u_j$.

In particular embodiments, a food-and-beverage recommendation system may continuously receive and collect dining information from its users and make food and/or beverage recommendations to its users. As additional dining information is collected, STEPS 202-205 of FIG. 2 may be performed from time to time or as needed to obtain updated matrices $U^{d1}$, $E^{d2}$, $I^{d3}$, $W^{U,E}$, $W^{U,I}$, and $W^{E,I}$, which may then be used to determine recommendations for specific users visiting specific establishments.

In addition, new people may become registered users of the food-and-beverage recommendation system be added to user set U; conversely, existing users may be removed from user set U if they no longer desire to receive the services provided by the food-and-beverage recommendation system. Similarly, new establishments may be added to establishment set E, and existing establishments may be removed from establishment set E. New food and/or beverage items may be added to item set I, and existing items may be removed from item set I. As these changes occur, STEPS 202-205 of FIG. 2 may be performed as needed to obtain updated matrices $U^{d1}$, $E^{d2}$, $I^{d3}$, $W^{U,E}$, $W^{U,I}$, and $W^{E,I}$.

In particular embodiments, the users of a food-and-beverage recommendation system may belong to a social network. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

Figure 3:
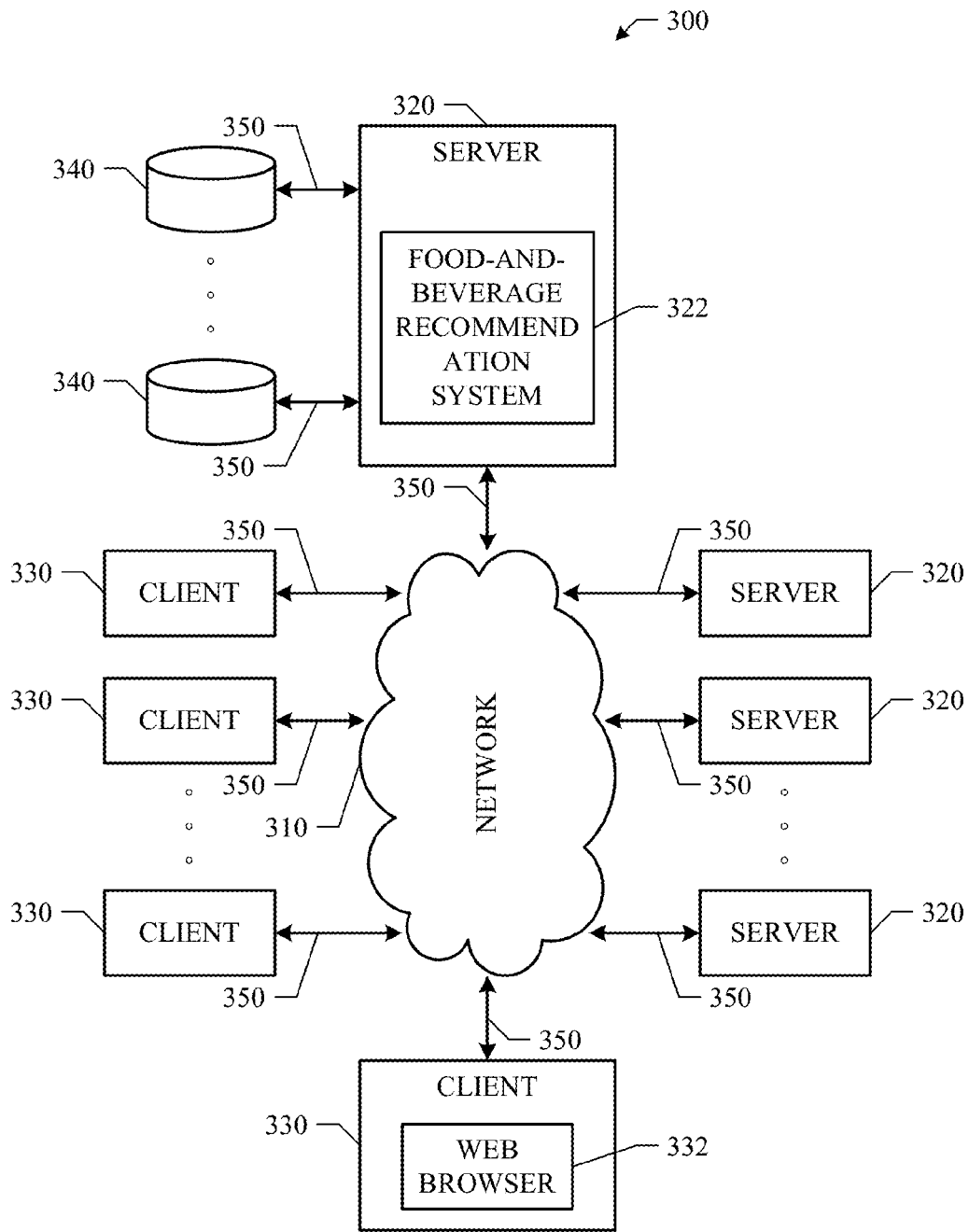
FIG. 3 illustrates an example network environment.

Particular embodiments may be implemented in a network environment. FIG. 3 illustrates an example network environment 300. Network environment 300 includes a network 310 coupling one or more servers 320 and one or more clients 330 to each other. In particular embodiments, network 310 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 310 or a combination of two or more such networks 310. The present disclosure contemplates any suitable network 310.

One or more links 350 couple servers 320 or clients 330 to network 310. In particular embodiments, one or more links 350 each includes one or more wired, wireless, or optical links 350. In particular embodiments, one or more links 350 each includes an intranet, an extranet, a VPN, a LAN, a WLAN, a WAN, a MAN, a communications network, a satellite network, a portion of the Internet, or another link 350 or a combination of two or more such links 350. The present disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores.

In particular embodiments, each client 330 may be an electronic device including hardware, software, or embedded logic components or a combination of two or more such components and capable of carrying out the appropriate functionalities implemented or supported by client 330. For example and without limitation, a client 330 may be a desktop computer system, a notebook computer system, a netbook computer system, a handheld electronic device, or a mobile telephone. A client 330 may enable a network user at client 330 to access network 310. A client 330 may have a web browser, such as Microsoft Internet Explorer or Mozilla Firefox, and may have one or more add-ons, plug-ins, or other extensions, such as Google Toolbar or Yahoo Toolbar. A client 330 may enable its user to communicate with other users at other clients 330. The present disclosure contemplates any suitable clients 330.

In particular embodiments, one or more data storages 340 may be communicatively linked to one or more servers 320 via one or more links 350. In particular embodiments, data storages 340 may be used to store various types of information. In particular embodiments, the information stored in data storages 340 may be organized according to specific data structures. Particular embodiments may provide interfaces that enable servers 320 or clients 330 to manage (e.g., retrieve, modify, add, or delete) the information stored in data storage 340.

In particular embodiments, a server 320 may include a food-and-beverage recommendation system 322. Food-and-beverage recommendation system 322 may include hardware, software, or embedded logic components or a combination of two or more such components for carrying out the appropriate functionalities implemented or supported by food-and-beverage recommendation system 322. In particular embodiments, food-and-beverage recommendation system 322 may implement the functionalities illustrated in FIG. 2.

Figure 4:
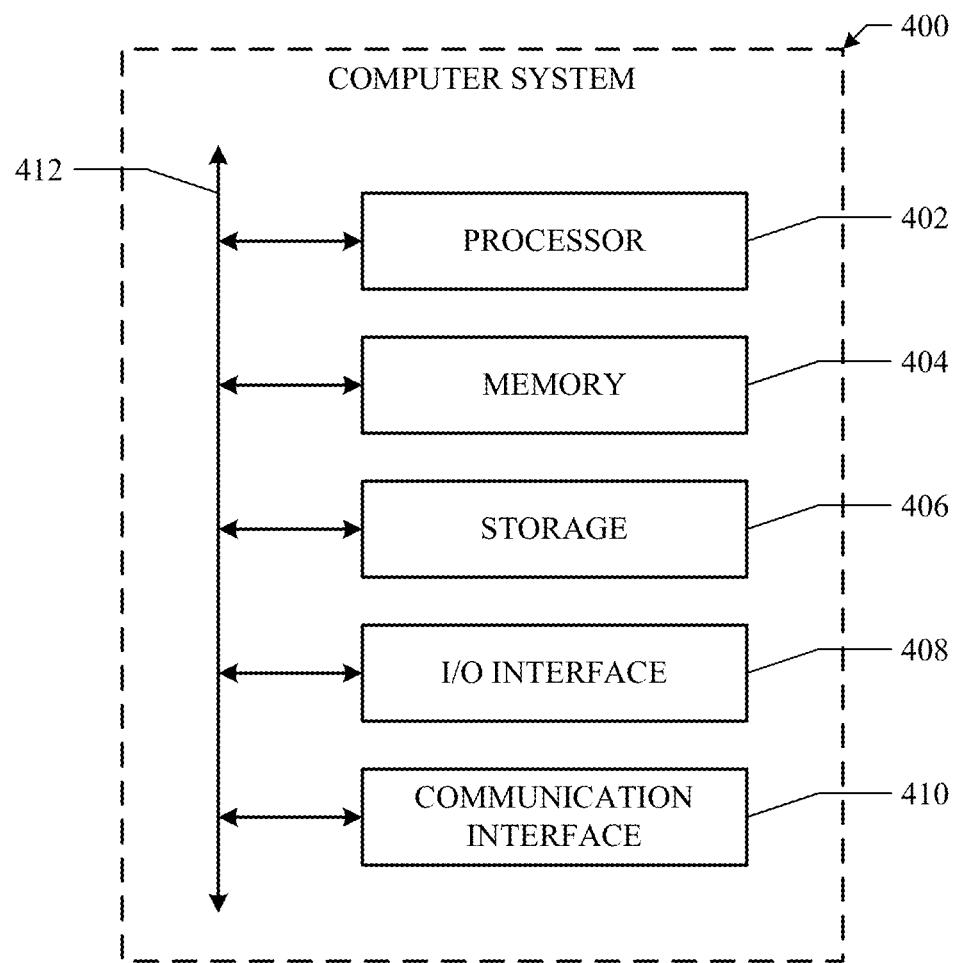
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. The present disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. The present disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising: by one or more computing devices,
    extracting a plurality of users, a plurality of establishments, and a plurality of items from dining information provided by at least one of the plurality of users, wherein:
        each of the plurality of establishments sells food or beverage and has been visited by at least one of the plurality of users; and
        each of the plurality of items is food or beverage sold at least one of the plurality of establishments and has been ordered by at least one of the plurality of users at least one of the plurality of establishments;
    constructing a user-establishment matrix, a user-item matrix, and an establishment-item matrix using the plurality of users, the plurality of establishments, and the plurality of items;
    generating a user latent representation for the plurality of users, an establishment latent representation for the plurality of establishments, and an item latent representation for the plurality of items; and
    computing one or more correlations using the user latent representation, the establishment latent representation, or the item latent representation, wherein each of the one or more correlations is between two of the plurality of users, two of the plurality of establishments, two of the plurality of items, one of the plurality of users and one of the plurality of establishments, one of the plurality of users and one of the plurality of items, or one of the plurality of establishments and one of the plurality of items; and
    receiving a recommendation request from a mobile device associated with a first one of the plurality of users at a first one of the plurality of establishment; determining one or more item recommendations with respect to the first user and the first establishment using the one or more correlations; and transmitting the one or more item recommendations to the mobile device.

2. The method of claim 1, wherein generating the user latent representation, the establishment latent representation, and the item latent representation comprises:
    applying a loss function to the user-establishment matrix, the user-item matrix, and the establishment-item matrix; and
    optimizing the loss function using stochastic gradient descent.

3. The method of claim 1, further comprising:
    constructing a user-feature matrix, an establishment-feature matrix, and an item-feature matrix;
    wherein generating the user latent representation, the establishment latent representation, and the item latent representation comprises:
        applying a loss function to the user-establishment matrix, the user-item matrix, the establishment-item matrix, the user-feature matrix, the establishment-feature matrix, and the item-feature matrix; and
        optimizing the loss function using stochastic gradient descent.

4. The method of claim 1, further comprising:
    receiving the dining information from one or more mobile devices associated with the at least one of the plurality of users; and
    determining one or more locations of the one or more mobile devices, respectively, when the one or more mobile devices transmit the dining information.

5. The method of claim 1, wherein the dining information comprises one or more digital images of at least one of the plurality of menu items, one or more digital images of one or more bills from at least one of the plurality of establishments, or one or more digital recordings of one or more conversations between at least one of the plurality of users and one or more employees of at least one of the plurality of establishments.

6. The method of claim 1, further comprising:
    extracting a plurality of tuples from the dining information, wherein each of the plurality of tuples comprises one of the plurality of users, one of the plurality of establishments the one user has visited, and one of the plurality of items the one user has ordered at the one establishment; and
    extracting the plurality of establishments and the plurality of items from the plurality of tuples.

7. A system comprising:
    a memory comprising instructions executable by one or more processors; and the one or more processors coupled to the memory and operable to execute the instructions, the one or more processors being operable when executing the instructions to:
    extract a plurality of users, a plurality of establishments, and a plurality of items from dining information provided by at least one of the plurality of users, wherein:
        each of the plurality of establishments sells food or beverage and has been visited by at least one of the plurality of users; and each of the plurality of items is food or beverage sold at least one of the plurality of establishments and has been ordered by at least one of the plurality of users at least one of the plurality of establishments;

construct a user-establishment matrix, a user-item matrix, and an establishment-item matrix using the plurality of users, the plurality of establishments, and the plurality of items;

generate a user latent representation for the plurality of users, an establishment latent representation for the plurality of establishments, and an item latent representation for the plurality of items; and compute one or more correlations using the user latent representation, the establishment latent representation, or the item latent representation, wherein each of the one or more correlations is between two of the plurality of users, two of the plurality of establishments, two of the plurality of items, one of the plurality of users and one of the plurality of establishments, one of the plurality of users and one of the plurality of items, or one of the plurality of establishments and one of the plurality of items; and receive a recommendation request from a mobile device associated with a first one of the plurality of users at a first one of the plurality of establishment;

determine one or more item recommendations with respect to the first user and the first establishment using the one or more correlations; and transmit the one or more item recommendations to the mobile device.

8. The system of claim 7, wherein generating the user latent representation, the establishment latent representation, and the item latent representation comprises:

apply a loss function to the user-establishment matrix, the user-item matrix, and the establishment-item matrix; and optimize the loss function using stochastic gradient descent.

9. The system of claim 7, wherein the one or more processors are further operable when executing the instructions to:

construct a user-feature matrix, an establishment-feature matrix, and an item-feature matrix;

wherein generating the user latent representation, the establishment latent representation, and the item latent representation comprises:

apply a loss function to the user-establishment matrix, the user-item matrix, the establishment-item matrix, the user-feature matrix, the establishment-feature matrix, and the item-feature matrix; and optimize the loss function using stochastic gradient descent.

10. The system of claim 7, wherein the one or more processors are further operable when executing the instructions to:

receive the dining information from one or more mobile devices associated with the at least one of the plurality of users; and determine one or more locations of the one or more mobile devices, respectively, when the one or more mobile devices transmit the dining information.

11. The system of claim 7, wherein the dining information comprises one or more digital images of at least one of the plurality of menu items, one or more digital images of one or more bills from at least one of the plurality of establishments, or one or more digital recordings of one or more conversations between at least one of the plurality of users and one or more employees of at least one of the plurality of establishments.

12. The system of claim 7, wherein the one or more processors are further operable when executing the instructions to:

extract a plurality of tuples from the dining information, wherein each of the plurality of tuples comprises one of the plurality of users, one of the plurality of establishments the one user has visited, and one of the plurality of items the one user has ordered at the one establishment; and extract the plurality of establishments and the plurality of items from the plurality of tuples.

13. One or more non-transitory computer-readable storage media embodying software operable when executed by one or more computer systems to:

extract a plurality of users, a plurality of establishments, and a plurality of items from dining information provided by at least one of the plurality of users, wherein:

each of the plurality of establishments sells food or beverage and has been visited by at least one of the plurality of users; and each of the plurality of items is food or beverage sold at least one of the plurality of establishments and has been ordered by at least one of the plurality of users at least one of the plurality of establishments;

construct a user-establishment matrix, a user-item matrix, and an establishment-item matrix using the plurality of users, the plurality of establishments, and the plurality of items;

generate a user latent representation for the plurality of users, an establishment latent representation for the plurality of establishments, and an item latent representation for the plurality of items; and compute one or more correlations using the user latent representation, the establishment latent representation, or the item latent representation, wherein each of the one or more correlations is between two of the plurality of users, two of the plurality of establishments, two of the plurality of items, one of the plurality of users and one of the plurality of establishments, one of the plurality of users and one of the plurality of items, or one of the plurality of establishments and one of the plurality of items; and receive a recommendation request from a mobile device associated with a first one of the plurality of users at a first one of the plurality of establishment;

determine one or more item recommendations with respect to the first user and the first establishment using the one or more correlations; and transmit the one or more item recommendations to the mobile device.

14. The media of claim 13, wherein generating the user latent representation, the establishment latent representation, and the item latent representation comprises:

apply a loss function to the user-establishment matrix, the user-item matrix, and the establishment-item matrix; and optimize the loss function using stochastic gradient descent.

15. The media of claim 13, wherein the software is further operable when executed by the one or more computer systems to:

construct a user-feature matrix, an establishment-feature matrix, and an item-feature matrix;

wherein generating the user latent representation, the establishment latent representation, and the item latent representation comprises:
  apply a loss function to the user-establishment matrix, the user-item matrix, the establishment-item matrix, the user-feature matrix, the establishment-feature matrix, and the item-feature matrix; and
  optimize the loss function using stochastic gradient descent.

16. The media of claim 13, wherein the software is further operable when executed by the one or more computer systems to:
  receive the dining information from one or more mobile devices associated with the at least one of the plurality of users; and
  determine one or more locations of the one or more mobile devices, respectively, when the one or more mobile devices transmit the dining information.

17. The media of claim 13, wherein the software is further operable when executed by the one or more computer systems to:
  extract a plurality of tuples from the dining information, wherein each of the plurality of tuples comprises one of the plurality of users, one of the plurality of establishments the one user has visited, and one of the plurality of items the one user has ordered at the one establishment; and
  extract the plurality of establishments and the plurality of items from the plurality of tuples.

* * * * *